April 22, 1941.　　　G. W. SCHATZMAN　　　2,238,948
FENDER SKIRT ATTACHING MECHANISM
Filed Jan. 9, 1939　　　2 Sheets-Sheet 1
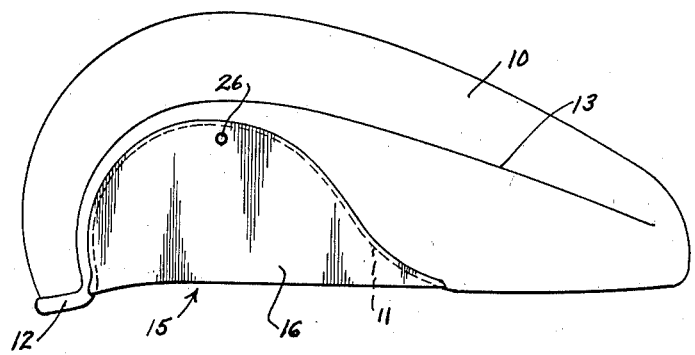
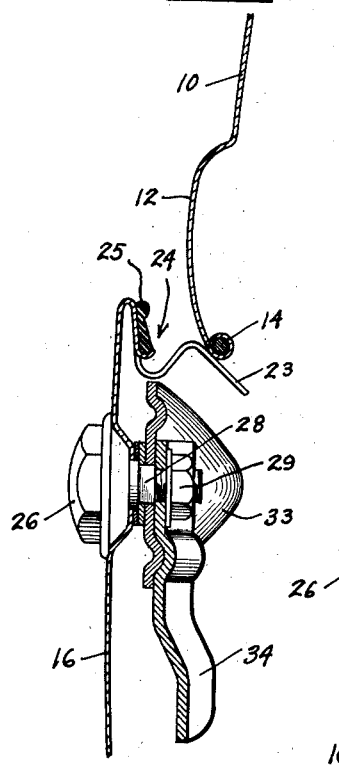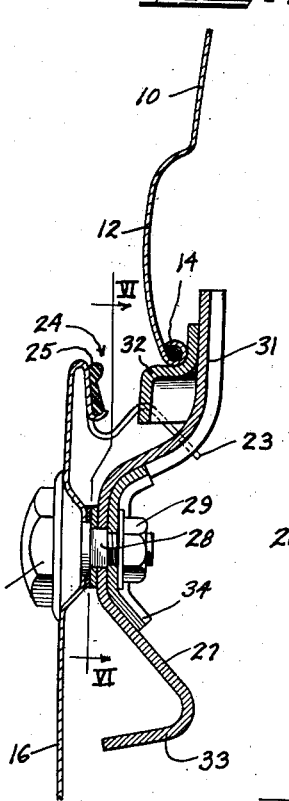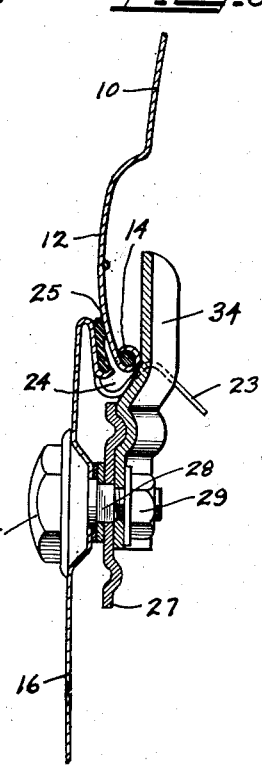
Inventor
George W. Schatzman.

April 22, 1941.　　　G. W. SCHATZMAN　　　2,238,948
FENDER SKIRT ATTACHING MECHANISM
Filed Jan. 9, 1939　　　2 Sheets-Sheet 2
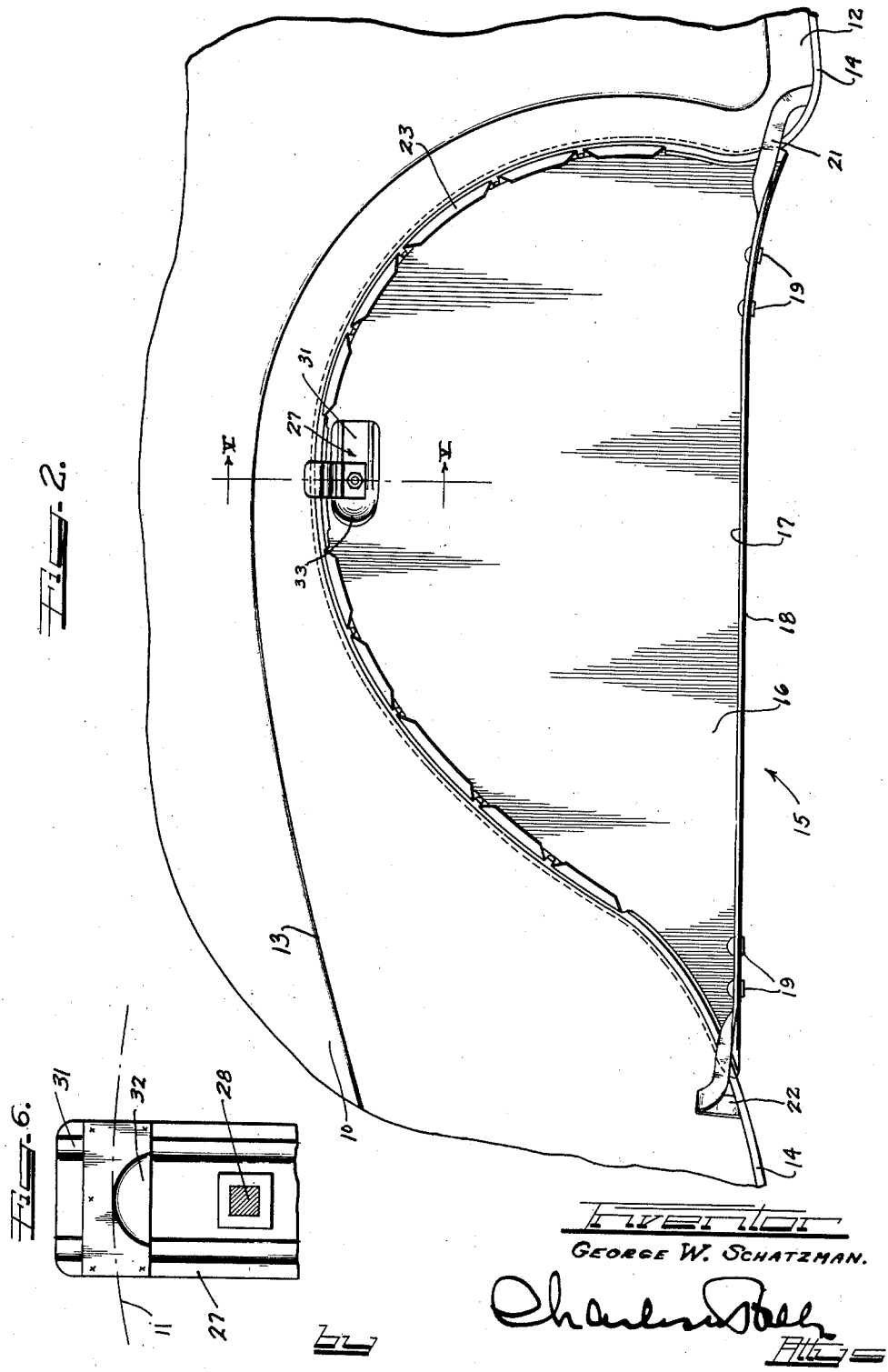
Inventor
GEORGE W. SCHATZMAN.

Patented Apr. 22, 1941

2,238,948

UNITED STATES PATENT OFFICE 2,238,948

FENDER SKIRT ATTACHING MECHANISM

George W. Schatzman, Detroit, Mich., assignor to Houdaille-Hershey Corporation, Detroit, Mich., a corporation of Michigan Application January 9, 1939, Serial No. 249,929

9 Claims. (Cl. 280—153)

This invention relates to means for covering or closing the wheel access opening in the fender or side of a vehicle. In particular, my invention relates to "fender shields" or "fender skirts," as such devices are known when used in connection with a fender, but this invention is equally applicable to automotive vehicles having a body wide enough to enclose the wheels without the use of fenders and in which the wheel access openings are in the sides of the body itself. Bodies of this type are to be found today only among commercial vehicles, such as trucks and busses, and are occasionally custom built for private vehicles, and I wish it to be expressly understood that this invention is equally applicable to such bodies on commercial and private vehicles as well as being applicable to fenders. Therefore, while I have referred to my invention as a "fender shield," it is to be clearly understood that this term includes covers for wheel access openings in the side of a body or other wheel enclosing member as well as for wheel access openings in fenders.

In designing ornamental fender shields or skirts of the type adapted to cover the usual wheel access opening in a vehicle fender or body, it is important that the means which is employed to secure the fender shield in position be simple and quick to operate both in assembling the fender shield on the vehicle fender and in removing it therefrom. It must also possess a considerable degree of ruggedness when in use and be substantially free from vibration and noise.

One type of fender shield which has been developed possesses the above described characteristics and has come into wide use. This type of fender shield comprises a sheet metal panel which fits over the wheel access opening in the fender and which is supported by a reinforcing or support bar extending along its lower edge and terminating in hook-like portions which extend in through the wheel access opening and rest against the back of the fender ahead of and behind the wheel access opening and on top of the beaded or inturned lower edge of the fender. The edge of the fender shield panel, in this type of fender shield, is generally slotted and bent in so as to form a plurality of spring fingers which fit around under and behind the edge of the wheel access opening and hold the fender shield against the side of the fender. The resiliency of the spring fingers, added to a small amount of resiliency in the hook end of the support bar along the bottom of the fender is enough to allow the fender shield to be snapped in place and held securely and also to be readily pried off when it is desired to remove it. Since fender shields of this type are held in place by a "snap-on" or spring action, both the security with which they are held on and the ease with which they are removed depend upon the accurate fitting of the fender shield to the fender opening.

It has, in practice, been found quite easy to maintain a satisfactory degree of accuracy in the manufacture of the fender shield and it has also been found that the fenders with an inturned edge are manufactured with a sufficient degree of accuracy and uniformity to avoid any material variation in the fit of the fender shield on the fender. However, it has been found that fenders with beaded edges and supposedly all alike will vary materially in the size of their wheel access openings. The result of this is that, although the fender shields are manufactured to a high degree of accuracy, they will be extremely hard to put on and take off of some fenders and will not fit very tightly on other fenders. This has made it necessary, in many cases, to employ a skilled mechanic to make a set of fender shields fit the fenders of a particular car.

The principal object of the present invention is to provide a fender skirt attaching mechanism which will facilitate the mounting of fender shields of the type described above on the fenders and which will positively hold them tightly in place. More specifically, it is an object of the present invention to provide a means for readily mounting a fender shield of the type described upon a fender having a slightly undersized wheel access openings and, at the same time, to provide a means for positively holding the fender shield in place on a fender having a slightly oversized wheel access opening in which the fender shield might otherwise not be sufficiently tight.

Another object of the present invention is to provide a combined cam and latch mechanism operated by a single member and having a cam to help in mounting the fender shield, a latch to positively hold it in place, and another cam to help in dismounting the fender shield.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of a vehicle fender having one embodiment of the invention mounted thereon;

Figure 2 is an inside elevational view of the form of the invention shown in Figure 1 as seen from the inside of the fender, showing the back or inner side of the fender shield as it appears when mounted upon the fender;

Figure 3 is a cross section on the line V—V of Figure 2, looking in the direction of the arrows but showing the cam and latch mechanism in the position which it occupies at the beginning of the process of mounting the fender shield upon the fender;

Figure 4 is a cross section similar to Figure 3 but showing the cam and latch mechanism rotated 90° from the position shown in Figure 3 to the position occupied by it in the middle of the process of mounting the fender shield;

Figure 5 is a view similar to Figure 4 but showing the cam and latch mechanisms rotated through a further angle of 90° to the position shown in Figure 2 at the end of the process of mounting the fender shield;

Figure 6 is a face view of one end of the cam lever as seen from the line VI—VI of Figure 4 looking in the direction of the arrows and showing the shape of one of the cam members.

The particular embodiment of the invention shown in the drawings is applied to a streamlined fender 10 having a streamlined wheel access opening whose edge is indicated by the dotted line 11 in Figure 1. At the bottom of the front of the fender and in front of and over the top of the wheel access opening 11, the fender 10 is embossed to simulate a molding 12. From a point above the wheel access opening 11, the edge 13 of the raised or embossed portion of the fender sweeps back in a long flowing curve which enhances the streamline appearance of the fender. The entire lower edge of the fender both ahead of and behind and around the wheel access opening 11 is reinforced by being formed into a beaded edge 14 around a wire core.

The fender shield 15 comprises an approximately flat sheet metal panel 16 having a longitudinally extending support bar 17 secured to a flange 18 along its lower edge by rivets 19, as shown in Figure 2.

The front end 21 of the support bar 17 curves back away from the center shield panel 16 and its extreme end is turned down and back toward the plane of the center shield panel. This construction enables the front end 21 of the support bar to pass behind the beaded edge 14 of the fender at the front end of the wheel access opening and to extend down and rest on top of the beaded edge 14 along the bottom edge of the fender ahead of the wheel access opening, as shown in Figure 2. The rear end 22 of the support bar 17 similarly curves back away from the fender shield panel 16 and terminates in an arched portion whose end is adapted to rest on the beaded edge 14 of the fender in back of the wheel access opening. The two ends 21 and 22 of the support bar 17 are thus firmly supported by the beaded edge 14 of the fender and serve to carry the entire weight of the fender shield.

The edge of the fender shield panel 16 at the front and back and around the top overlaps the edge of the fender 10 a short distance and is folded back on the body of the panel 16 as shown in Figures 3 to 5.

Around a considerable portion of the upper periphery of the fender shield panel 16, the folded back edge of the panel is formed into a plurality of spring fingers 23 adapted to extend through the wheel access openings and up behind the beaded edge 14 of the fender. The upturned portions of the spring fingers 23 define a groove 24 adapted to receive the edge 14 of the fender, and the extreme end portions of the fingers 23 extend down at an angle and form cam surfaces for guiding the edge of the fender into the groove 24.

In order to dampen out any any rattle or squeak which might otherwise occur, one edge of the groove 24 is lined with a strip of anti-rattle material 25, which may be of rubber or suitable impregnated fabric and which may be secured to the panel 16 by wire staples or any other suitable fastening means.

In order to facilitate the forcing of the "hump" of the spring fingers 23 underneath the beaded edge 14 of the fender, I have provided a cam mechanism for forcing the fender shield down with respect to the fender, this movement being permitted by the resiliency of the ends 21 and 22 of the support bar 17 at the bottom of the fender shield. This mechanism comprises a hexagonal headed bolt or stud 26 journaled in the fender shield panel 16 near its upper edge, as shown in Figures 3 to 5, and having a cam lever 27 mounted on it in back of the panel 16. The portion 28 of the bolt 26 which carries the cam lever 27 is square, and the cam lever 27 is firmly fixed thereon by a nut 29 so that it can be rotated in back of the panel 16 by rotating the head of the nut 26 on the front of the panel.

One end 31 of the cam lever 27 is offset away from the plane of the fender shield panel 16 and has a sheet metal cam member 32 welded to its front face, as shown in Figure 6. These parts are positioned so that, when the ends 21 and 22 of the support bar 17 are hooked onto the edge 14 of the fender, as shown in Figure 2, and the fender shield is pushed against the side of the fender until the spring fingers 23 engage the edge of the wheel access opening, as shown in Figure 3, the cam lever 27 and cam 32 can be swung up so as to engage the edge 14 of the fender as shown in Figure 4. When the cam lever 27 is rotated to its vertical position shown in Figure 4, the entire fender shield is pushed down far enough so that the spring fingers 23 can readily pass under the edge 14 of the fender 10, allowing the groove 24 to embrace the edge 14 of the fender as shown in Figure 5. In mounting the fender shield on the fender, the cam lever 27 may be turned through a full 90° from the initial postion shown in Figure 3 to the position shown in Figure 4 before the fender shield is pushed in against the fender and the cam 32 is allowed to spring up behind the edge 14 of the fender as the fender shield is forced up into position by the resiliency of the ends 21 and 22 of the support bar 17. It has, however, been found preferable in practice to simultaneously turn the cam lever 27 toward the position shown in Figure 4 and to press the top of the fender shield panel 16 in against the side of the fender. When this is done, the fingers 23 slide under the edge 14 of the fender, and the fender shield is forced down by the cam 32 only far enough to allow the "hump" in the fingers 23 to pass in under the edge 14 of the fender. As soon as the cam 32 has forced the fender shield 16 down far enough for this to occur, the pressure simultaneously applied to the outside of the fender shield panel 16 moves the fender shield in against the fender and moves the cam 32 back out from under the edge 14 of the fender. As soon as this occurs, the resilient ends 21 and 22 of the support bar 21 push the fender shield up into its final position on the fender with the edge of the fender down in the groove 24 around the periphery of the fender shield.

If the fender 10 happens to be one in which the wheel access opening 11 is of the correct size, the ends 21 and 22 of the support bar and the spring fingers 23 will be sufficient to hold the fender shield securely in place, but, if the fender happens to be one which has a slightly oversized wheel access opening 11, a severe bump or jar may be enough to jar the fender shield loose. To guard against such an occurrence, I have provided a latch 34 which is welded to the back of the cam lever 27 and projects at right-angles to it, as shown in Figure 2. The latch member 34 is brought into action after the fender shield has been snapped into position by rotating the bolt 26 an additional 90° from the position shown in Figure 4 to the position shown in Figures 2 and 5. In this position, the latch member 34 projects up a considerable distance above and behind the edge 14 of the fender and bears tightly against it so as to positively prevent any outward movement of the fender shield.

In order to facilitate the removal of the fender shield, the end 33 of the cam lever 27 opposite from the end which carries the cam 32 for assisting in the mounting of the fender shield is formed into a pry-off cam, which is shaped to press up and in on the edge 14 of the fender when the cam lever 27 is rotated in a clockwise direction from the position shown in Figure 2. This action forces the upper edge of the fender shield down and out so that the groove 24 is withdrawn from its engagement with the edge 14 of the fender and the spring fingers 23 are withdrawn through the wheel access openings. The upper part of the fender shield may then be swung out away from the fender, which loosens its engagement with the fender at the bottom and allows the ends 21 and 22 of the support bar 17 to be disengaged from the rolled edge 14 at the bottom of the fender, permitting the entire fender shield to be dismounted.

From the above description, it will be seen that I have provided a fender skirt attaching mechanism which permits the application of force with considerable leverage for both mounting and dismounting the fender skirt upon the fender and which therefore permits the engagement of the fender skirt with the fender to be considerably tighter than would otherwise be practical. My mechanism also provides means for securing a tight engagement of the fender shield with the fender even when the fit between them is rather loose. Thus, the use of my fender shield attaching mechanism permits a fender shield to be fitted upon fenders having considerably more variation in size than has hitherto been practical and overcomes one of the difficulties that has hitherto been present in the manufacturing and selling of fender shields.

While I have shown but one particular embodiment of my invention, it will, of course, be understood that I do not wish to be limited thereto, as many modifications may be made, such as making the cam lever cam and latch member out of a single piece of metal, and I therefore contemplate by the appended claims to cover all such modifications as fall within the true spirit and scope of my invention. It is also to be understood that the term "fender" as used in the claims includes the side of a vehicle body where the body itself, rather than a separate fender, encloses the wheel.

I claim as my invention:

1. In a fender shield, a panel having means near the upper edge thereof for embracing the edge of a wheel access opening in a fender, means for holding the lower part of the panel against said fender and for resiliently supporting said panel, and a mounting device comprising means mounted on and movable with respect to the panel for engaging the edge of said fender near the top of said wheel access opening and for forcing said panel down far enough to lower said embracing means below said edge of said wheel access opening while permitting movement of the top of the panel towards said fender.

2. In a fender shield, a panel having a groove along the upper edge thereof and adapted to receive the edge of the wheel access opening of a fender, a support bar extending along the lower edge of said panel and having resilient ends adapted to extend behind the side of said fender and rest upon supports on the back of said fender, and a mounting device comprising a cam mechanism for engaging the edge of said wheel access opening near the top thereof and for exerting a force tending to push said panel down with respect to said fender, said mechanism being constructed and arranged to move said panel down far enough to thereafter permit inward movement of the top of said panel toward said fender without further downward movement of said fender shield or further action of said mechanism.

3. In a fender shield comprising a panel having a groove along its upper edge adapted to receive the edge of the wheel access opening of a fender and a support bar extending along the lower edge of said panel and having resilient ends adapted to extend behind the side of a fender and rest on supports on the back of said fender, a mounting device comprising a cam mechanism for engaging the edge of said wheel access opening near the top thereof and for exerting a force tending to push said panel down with respect to said fender, said mechanism being constructed and arranged to move said panel down for enough to bring the rear side of said groove lower than said edge of said wheel access opening and to thereafter permit inward movement of the top of the panel towards said fender without further downward movement of said fender shield or further action of said mechanism.

4. In a fender shield having a panel, means for holding the lower part of said panel against a fender and for resiliently supporting said panel, and means near the upper part of said panel for embracing the edge of a wheel access opening in said fender, a mounting device comprising means for pushing said panel down with respect to said fender far enough to lower the rear part of said embracing means below said edge of said opening while permitting movement of the top of said panel towards said fender, said means being constructed and arranged to exert a force acting on said fender along a line extending down behind and not passing through said panel.

5. In a fender shield having a panel, means for holding the lower part of said panel against a fender and for resiliently supporting said panel, and means near the upper part of said panel for embracing the edge of a wheel access opening in said fender, a cam for engaging said edge of said opening near the top thereof and forcing said panel down, said cam having a fender engaging surface perpendicular to the plane of said panel and slidable across said edge, the operative portion of said surface being farther from the axis of rotation of said cam than the normal position of said edge of said wheel access opening.

6. In a fender shield having a panel, means for holding the lower part of said panel against a fender and for resiliently supporting said panel, and means near the upper part of said panel for embracing the edge of a wheel access opening in said fender, a cam on the back of said panel rotatable in a plane approximately parallel to the plane of said panel and having a surface for engaging and pressing up on the edge of said wheel access opening, said cam being shaped so that no portion thereof rises up in front of said fender when said surface is in engagement with said edge whereby said cam and the upper part of said panel may readily slide back with respect to said fender.

7. In a fender shield having a panel, means for holding the lower part of said panel against a fender and for resiliently supporting said panel, and means near the upper part of said panel for embracing the edge of a wheel access opening in said fender, a combined mounting and dismounting mechanism comprising a member rotatable about an axis fixed with respect to said panel and carrying two cam surfaces alternately engageable with the edge of said wheel access opening, one of said cam surfaces being placed at an angle to exert a force pushing said panel down and acting on a line extending down behind and clear of said panel and the other of said cam surfaces being placed at an angle to exert a force pushing said panel down and acting on a line extending obliquely down through said panel.

8. In a fender shield having a panel, means for holding the lower part of said panel against a fender and for resiliently supporting said panel, and means near the upper part of said panel for embracing the edge of a wheel access opening in said fender, a combined mounting and dismounting mechanism comprising a member manually rotatable on an axis fixed with respect to said panel and a lever fixed to said member in back of said panel with its ends projecting in opposite directions from said axis, one of said ends being constructed and arranged to push up and back against the edge of said wheel access opening when forced into contact therewith by the rotation of said member and the other of said ends being arranged to push up against the edge of said wheel access opening without pushing back when forced into contact therewith by the rotation of said member.

9. In a fender shield having a panel, means for holding the lower part of said panel against a fender and for resiliently supporting said panel, and means near the upper part of said panel for embracing the edge of a wheel access opening in said fender, a combined mounting and dismounting and latching mechanism comprising a member manually rotatable on an axis fixed with respect to and approximately perpendicular to said panel, and a three-armed lever fixed to said member in back of said panel, two of said arms extending in opposite directions and having cam surfaces for engaging the edge of said wheel access opening, both of said cam surfaces facing upwards when brought into contact with said edge but only one thereof facing upwards and back, and the third of said arms extending perpendicularly to said oppositely extending arms and being shaped to bear against the back of said edge and function as a latch when rotated by said manually rotatable member to an upwardly extending position.

GEORGE W. SCHATZMAN.